United States Patent [19]

Motomura

[11] Patent Number: 5,544,335
[45] Date of Patent: Aug. 6, 1996

[54] PROCESSOR FOR DATA TRANSMITTED IN ACCORDANCE WITH A PLURALITY OF TRANSMISSION METHODS, WHICH GENERATES OUTPUT DATA APPLICABLE TO THE OUTPUT DEVICE

[75] Inventor: Yasutaka Motomura, Nagasaki, Japan

[73] Assignee: Mitsubishi Denki Kabushiki Kaisha, Tokyo, Japan

[21] Appl. No.: 265,616

[22] Filed: Jun. 24, 1994

Related U.S. Application Data

[63] Continuation of Ser. No. 814,449, Dec. 30, 1991, abandoned.

[30] Foreign Application Priority Data

Jan. 17, 1991 [JP] Japan ............................. 3-15720

[51] Int. Cl.⁶ ............................................ G06F 15/16
[52] U.S. Cl. .............. 395/311; 395/200.02; 364/DIG. 1; 364/DIG. 2; 340/825.07
[58] Field of Search ....................... 395/800, 725, 395/775, 500, 575, 325, 200, 700, 550, 250; 370/58.1, 67, 79, 85.1, 110.1, 62, 42; 340/825.03, 827, 825.14, 825.2, 825.39, 825.76; 371/11.2, 20.2, 46, 68.1; 364/148, 160, DIG. 1, DIG. 2

[56] References Cited

U.S. PATENT DOCUMENTS

| | | | |
|---|---|---|---|
| 4,079,452 | 3/1978 | Larson et al. | 395/275 |
| 4,181,936 | 1/1980 | Kober | 395/200 |
| 4,597,074 | 6/1986 | Demichelis et al. | 370/58.2 |
| 4,677,611 | 6/1986 | Yanosy, Jr. et al. | 340/825.5 |
| 4,700,358 | 10/1987 | Duncanson et al. | 371/49.1 |
| 4,701,923 | 10/1987 | Fukasawa et al. | 371/41 |
| 4,734,853 | 3/1988 | Nakano | 364/DIG. 1 |
| 4,757,443 | 7/1988 | Hecker et al. | 395/275 |
| 4,903,258 | 2/1990 | Kuhlmann et al. | 370/58.2 |
| 4,908,779 | 3/1990 | Iwata | 395/131 |
| 4,943,984 | 7/1990 | Pechanek et al. | 375/358 |
| 5,077,552 | 12/1991 | Abbate | 340/85.25 |
| 5,142,528 | 8/1992 | Kobayashi | 370/79 |

FOREIGN PATENT DOCUMENTS

| | | |
|---|---|---|
| 2-29141 | 1/1990 | Japan . |
| 2-161855 | 6/1990 | Japan . |
| 1573046 | 8/1980 | United Kingdom . |
| 2197099 | 5/1988 | United Kingdom . |

OTHER PUBLICATIONS

"The Illustrated Dictionary of Microcomputers", 3rd edition; Michael F. Hordesk; TAB Professional and Reference Books; 1990, P.A.; p. 50.

*Primary Examiner*—Daniel H. Pam
*Attorney, Agent, or Firm*—Burns, Doane, Swecker & Mathis, L.L.P.

[57] ABSTRACT

A processor for transmitted data applicable to plural transmission methods, respectively, without exchanging hardware or software even when the transmission method of an apparatus on the transmitting side changes. The processor stores a plurality of programs for analyzing the transmitted data in accordance with the plurality of transmission methods. The processor thereby selecting the suitable program for the specified transmission method and generates output data applicable to an output device.

5 Claims, 3 Drawing Sheets

PROCESSOR FOR DATA TRANSMITTED IN ACCORDANCE WITH A PLURALITY OF TRANSMISSION METHODS, WHICH GENERATES OUTPUT DATA APPLICABLE TO THE OUTPUT DEVICE

This application is a continuation, of application Ser. No. 07/814,449, filed Dec. 30, 1991, now abandoned.

BACKGROUND OF THE INVENTION

1. Field of the Invention

This invention relates to a processor for transmitted data such as an image processing apparatus, which displays an analog video image or a digital image on a large-scale display device, an RGB monitor, etc., based on the data transmitted from a host computer, for example.

2. Description of the Related Art

FIG. 1 is a structural block diagram of a conventional image processor. In FIG. 1, a host computer 1 generates display control data such as a television signal to display an image on a display unit 4 to be described later, and converts the data to electric or optical signals in accordance with the transmission method of the host computer 1, for example, start-stop transmission, HDLC (high level data ink control procedure), BSC (basic mode data transmission control procedures), or the like. Then, the transmission data is transmitted to an image processing apparatus 2 through a transmission line 3.

The image processing apparatus 2 as above contains a CPU card 21 for one transmission method for processing the transmitted data and a CPU card 22 to generate image data to be supplied to the display unit 4. The CPU card 21 for processing the transmitted data is exchanged in response to changes in the transmission method of the host computer 1. The CPU card 21 for processing the transmitted data carries a memory which stores a program to analyze the transmitted data in accordance with the transmission method of the host computer 1 and a CPU to analyze the transmitted data in accordance with the analyzing program. The CPU card 22 For generating image data is provided with a memory which stores a program to generate image data applicable to the display unit 4 from the analyzed data and a CPU to generate image data in accordance with the image data generating program.

As for the conventional image processing apparatus 2 of the above-described structure, it is necessary to exchange the CPU card 21 for processing the transmitted data for another CPU card corresponding to the new transmission method, or to update the analyzing program stored in the memory of the CPU card 21 when the transmission method of the host computer 1 changes. Therefore, for applying the image processing apparatus to many kinds of transmission methods, it requires the corresponding number of CPU cards or programs, thereby consuming a great deal of labor and cost to manage the same.

SUMMARY OF THE INVENTION

This invention has been devised to solve the aforementioned disadvantages, and has for its main object is to provide a processor for transmitted data in which it is unnecessary to exchange hardware or software even when the transmission method of the apparatus on the transmitting side changes.

The above and further objects and features of the invention will more fully be apparent from the following detailed description with accompanying drawings.

DESCRIPTION OF THE PREFERRED EMBODIMENTS

The embodiment of the present invention will now be depicted in detail with reference to the drawings.

Figure 1:
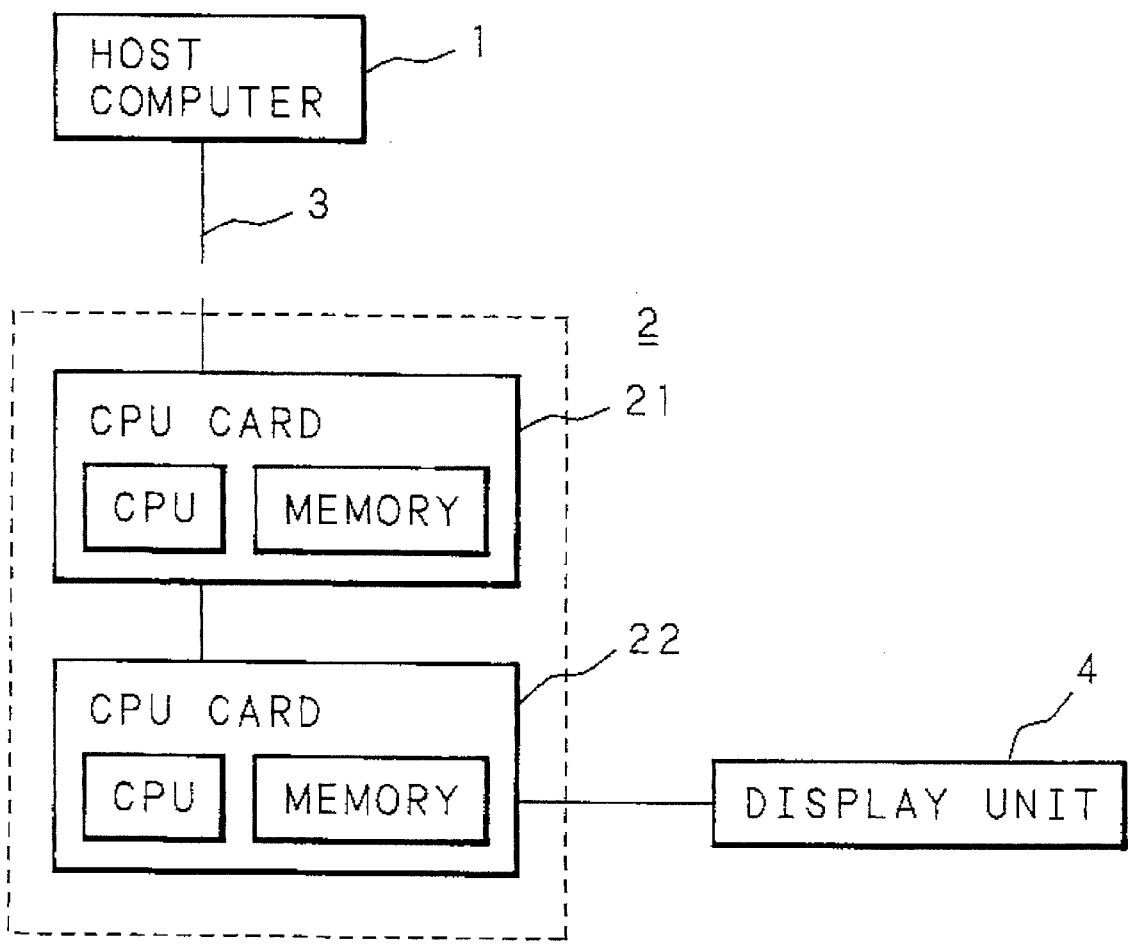
FIG. 1 is a structural block diagram of a conventional image processing apparatus.
Figure 2:
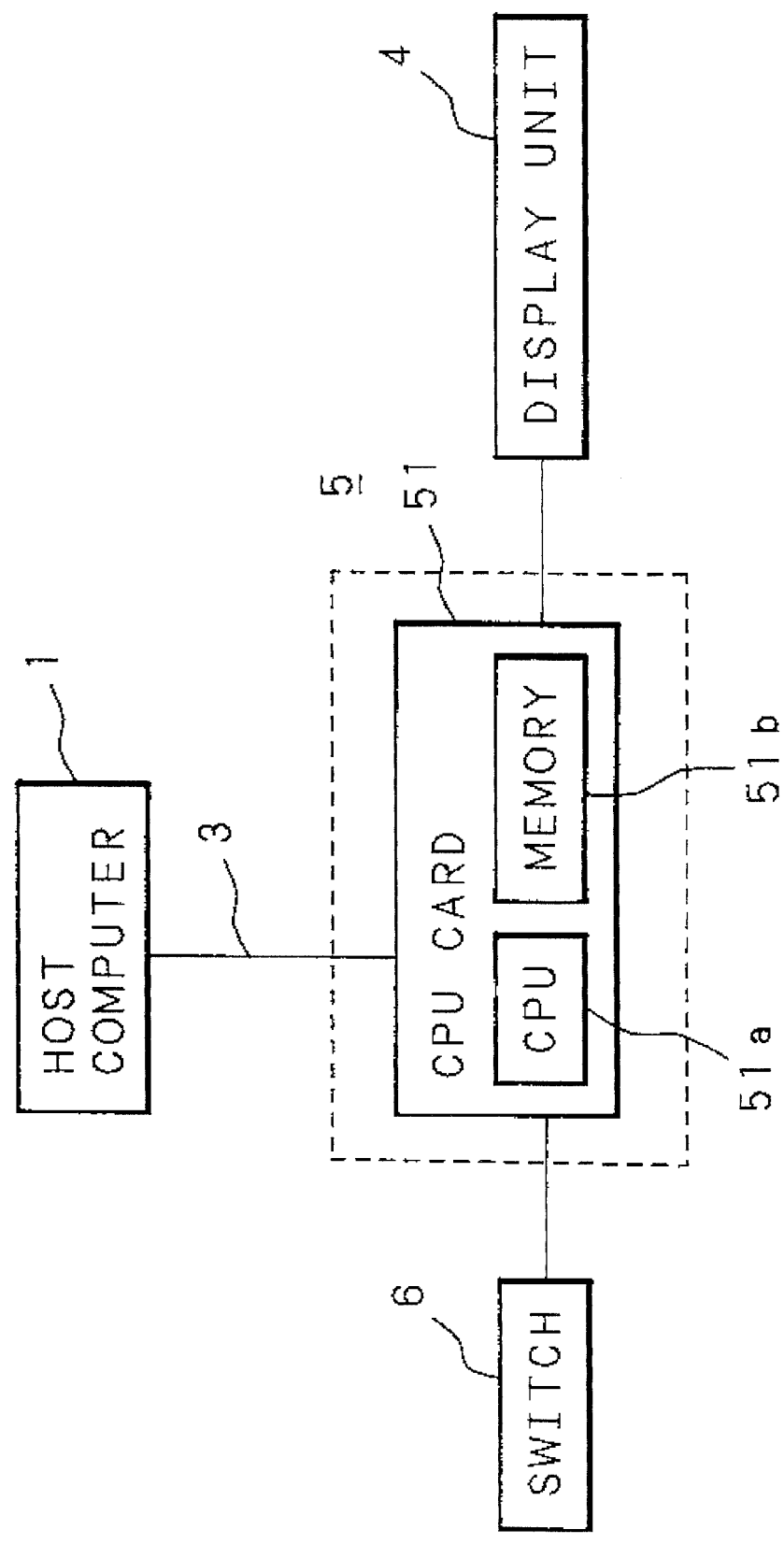
FIG. 2 is a structural block diagram of an image processing apparatus according to this invention.

FIG. 2 is the structural block diagram of an image processing apparatus according to this invention. In the figure, a host computer 1 generates display control data such as a television signal to display an image on a display unit 4 to be described later, and converts the data to electric or optical signals in accordance with the transmission method of the host computer 1 such as start-stop transmission, HDLC, BSC, or the like. Then, the transmission data is transmitted to an image processing apparatus 5 through a transmission line 3.

The image processing apparatus 5 contains a CPU card 51 which analyzes the transmission data in accordance with the transmission method of the host computer 1 and generates image data to be fed to the display unit 4. The CPU card 51 carries a CPU 51a and a memory 51b. The memory 51b stores a plurality of programs to analyze the transmission data in accordance with the plurality of transmission methods, respectively, and a program to generate image data applicable to the display unit 4 from the analyzed data. The CPU 51a analyzes the transmission data according to the analyzing program thereby to generate image data in accordance with the image data generation program.

The image processing apparatus 5 is provided with a switch 6 to specify the transmission method. An input signal from the switch 6 is input to the CPU card 51. The image data generated by the image processing apparatus 5 is sent to the display unit 4.

Figure 3:
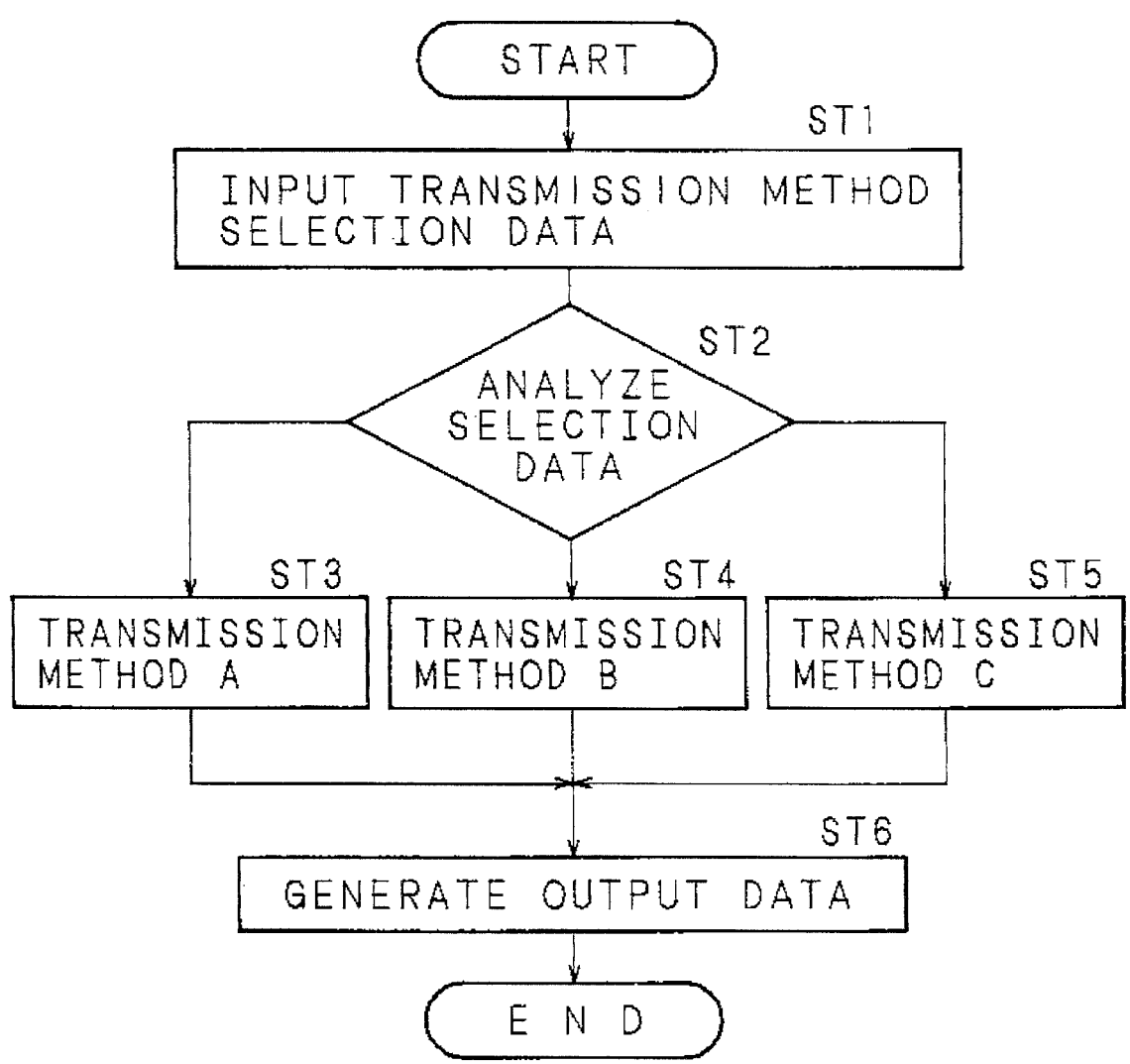
FIG. 3 is a flow chart showing the operation of the image processing apparatus of this invention.

The operation of the image processing apparatus in the structure described above will be depicted with reference to a flow chart in FIG. 3.

When a selection signal for specifying the transmission method is input by the switch 6 (ST1), the CPU 51a analyzes the input signal thereby to detect which of the transmission methods A, B or C is selected (ST2). Then, the CPU 51a reads an analyzing program corresponding to the detected transmission method from-the memory 51b (ST3, ST4, ST5), and analyzes the transmitted data from the host computer 1 in accordance with the analyzing program thereby to generate image data applicable to the display unit 4 from the analyzed data (ST6).

For example, when HDLC is selected as the transmission method, CPU 51a excludes the header of the transmitted data only necessary for transmission, and picks out command codes and parameters included in the display control data in accordance with the analyzing program for HDLC. Then, the CPU 51a detects the kind of displaying or characters of the text to be displayed, and generates commands for displaying such as "display a text", "display a rectangle", or the like thereby to generate image data in accordance with the image generating program.

Although the description is related to the image processing apparatus in the above embodiment, this invention is not restricted to the image processing apparatus, but is applicable to a processor for any transmitted data through a transmission line and the same effect is achieved as in the instant embodiment.

Although the transmission methods are three in the above embodiment, the number of the transmission methods is not limited to 3.

In addition, means for specifying the transmission method is not, necessarily a switch as in the present embodiment.

As this invention may be embodied in several forms without departing from the spirit of essential characteristics thereof, the present embodiment is therefore illustrative and not restrictive, since the scope of the invention is defined by the appended claims rather than by the description preceding them, and all changes that, fall within the metes and bounds of the claims, or equivalence of such metes and bounds thereof are therefore intended to be embraced by the claims.

What is claimed is:

1. A processor for receiving transmitted data from an apparatus and which generates output data applicable to an output device from the transmitted data in accordance with a plurality of transmission methods each for use by the apparatus during transmission of the data to said processor, comprising:

a memory for storing, in correspondence with each of the transmission methods, a plurality of programs, each for analyzing the transmitted data in accordance with a corresponding transmission method, and a second program to generate output data applicable to the output device;

means for specifying one of the plurality of transmission methods, wherein the specifying means operates independently of information transmitted from the apparatus to the processor, and wherein the specifying means does not receive an input signal from the apparatus or from the output device; and a CPU which analyzes the transmitted data in accordance with one of the plurality of programs which correspond to the specified transmission method thereby to generate output data applicable to the output device.

2. A processor for transmitted data according to claim 1, wherein said transmitted data includes image data and said output device is a display device.

3. A processor for transmitted data according to claim 1, wherein said plurality of transmission methods are categorized according to the data transmission being synchronous or asynchronous.

4. A processor for transmitted data according to claim 1, wherein said memory and CPU are carried on one card.

5. A processor for transmitted data according to claim 1, wherein said specifying means of the transmission method is a switch for inputting a selection signal into the CPU, the selection signal specifying one of the transmission methods.

* * * * *